(12) United States Patent
Sant Pont

(10) Patent No.: US 12,710,130 B2
(45) Date of Patent: Aug. 18, 2026

(54) ARTICULATED SUPPORT ARM

(71) Applicants: Olga Sant Barba, Barcelona (ES); Anna Sant Barba, Barcelona (ES)

(72) Inventor: Josep Sant Pont, Sant Martí de Centelles (ES)

(73) Assignees: Anna Sant Barba, Barcelona (ES); Olga Sant Barba, Barcelona (ES)

( * ) Notice: Subject to any disclaimer, the term of this patent is extended or adjusted under 35 U.S.C. 154(b) by 121 days.

(21) Appl. No.: 18/289,258

(22) PCT Filed: Apr. 11, 2022

(86) PCT No.: PCT/ES2022/070225
§ 371 (c)(1),
(2) Date: Dec. 1, 2023

(87) PCT Pub. No.: WO2022/234166
PCT Pub. Date: Nov. 10, 2022

(65) Prior Publication Data

US 2024/0392913 A1 Nov. 28, 2024

(30) Foreign Application Priority Data

May 3, 2021 (ES) ............................ ES202130897U

(51) Int. Cl.
*F16M 11/40* (2006.01)
*F21V 21/14* (2006.01)

(52) U.S. Cl.
CPC ............ *F16M 11/40* (2013.01); *F21V 21/14* (2013.01)

(58) Field of Classification Search
CPC ........ F21V 21/145; F21V 21/32; F21V 21/14; F21V 21/26; F16M 11/40; F16M 2200/065
(Continued)

(56) References Cited

U.S. PATENT DOCUMENTS 3,168,252 A * 2/1965 Cabernoch ............ F21V 21/104 362/404
3,266,059 A * 8/1966 Stelle ......................... B25J 9/06 138/131
(Continued)

FOREIGN PATENT DOCUMENTS

EP 0381909 A1 * 8/1990 ............ F16M 13/02
ES 289848 U 11/1986
(Continued)

*Primary Examiner* — Jonathan Liu
*Assistant Examiner* — Guang H Guan
(74) *Attorney, Agent, or Firm* — Robert Joseph Hess; Hess Patent Law Firm

(57) ABSTRACT

An articulated supporting arm having a first rigid section, a second rigid section, a third rigid section, a first flexible section and a second flexible section, The articulated supporting arm is formed by a plurality of flat strips having two flat sides parallel to each other, Each of the flat strips has one or two flat sides overlapped with, parallel to and in close contact with, flat sides of adjacent flat strips. A compressive covering compresses the flat strips in a radial direction, such that flexural mobility of the first and second flexible sections is limited to a flexural plane perpendicular to the overlapped flat sides and a bending of the first flexible section in a first direction is transmitted to the second flexible section through a slip between the flat strips, causing an automatic bending of the second flexible section in a second direction opposed to the first direction.

11 Claims, 5 Drawing Sheets

(58) Field of Classification Search
USPC .................. 248/160; 362/197, 198, 199, 413
See application file for complete search history.

(56) References Cited

U.S. PATENT DOCUMENTS

| | | | | | |
|---|---|---|---|---|---|
| 3,681,590 | A * | 8/1972 | Dickie | F21V 21/145 | 362/198 |
| 3,875,720 | A * | 4/1975 | Russell | E01F 9/627 | 403/291 |
| 3,962,678 | A * | 6/1976 | Kurokawa | F21S 6/003 | 362/413 |
| 4,494,417 | A * | 1/1985 | Larson | B25J 18/06 | 446/368 |
| 4,789,576 | A * | 12/1988 | Sant-Pont | F16M 11/40 | 403/DIG. 1 |
| 4,912,612 | A * | 3/1990 | Giorgi | F21S 6/006 | 362/418 |
| 5,008,793 | A * | 4/1991 | Copeland | F21S 6/003 | 362/419 |
| 5,244,176 | A | 9/1993 | Sant Pont et al. | | |
| 5,775,334 | A * | 7/1998 | Lamb | A61G 13/12 | 128/845 |
| 5,956,861 | A * | 9/1999 | Barnes | A45D 20/12 | 34/91 |
| 6,375,385 | B1 * | 4/2002 | Kennedy | E01F 9/65 | 404/9 |
| 8,224,485 | B2 * | 7/2012 | Unsworth | B25J 9/065 | 700/253 |
| 2024/0189981 | A1 * | 6/2024 | Hirata | B25J 9/104 | |
| 2024/0392913 | A1 * | 11/2024 | Sant Pont | F21V 21/32 | |

FOREIGN PATENT DOCUMENTS

| | | | |
|---|---|---|---|
| ES | 2036432 | A1 | 5/1993 |
| JP | 2007278496 | A * | 10/2007 |
| JP | 2014111148 | A | 6/2014 |
| WO | WO 9220957 | A1 | 11/1992 |

* cited by examiner

ARTICULATED SUPPORT ARM

FIELD OF THE ART

This invention relates to the field of articulated supporting arms including at least one flexible section susceptible of being plastically bent and which may return to its original position. This type of supporting arms commonly have an end attached to an anchoring support and a second end holding a functional element, such as, for instance, a light emitter, a clamp or a tool, in a certain relative position with respect to the anchoring point, which may be adjusted by means of the deformation of said supporting arm.

STATE OF THE ART

Deformable supporting arms are known in the state of the art. For instance, supporting arms comprised of articulated straight bars, which are connected to each other by means of springs, or other solutions based on segments connected with each other by means of hinges or ball joints with a high static friction coefficient are very popular.

For example, document U.S. Pat. No. 4,949,927A describes a deformable supporting arm consisting of a plurality of straight tubular segments linked together by means of hollow spherical ball joints, the whole arm including a tensioning cable crossing all straight tubular segments and all the hollow spherical ball joints applying tension that presses the elements together in the longitudinal direction of the arm, increasing the friction between said elements.

Document ES2036432A1 is also known describing a supporting arm having rigid sections and flexible sections, wherein the flexible sections are composed of overlapping flat strips covered with a compressive covering that, by means of the friction between the flat strips, keeps the flexible sections bent in the desired position. However, this document does not describe any solution that allows to obtain a supporting arm capable of carrying out a parallelogram-type movement, that is one that, by modifying the angle of one of the flexible sections, will cause the inverse deformation of another of the flexible sections, allowing, for instance, for a horizontal or vertical displacement of the end of the supporting arm in spite of modifying the angular position of some of its rigid sections with respect to said vertical or said horizontal references.

BRIEF DESCRIPTION OF THE INVENTION

This invention relates to a articulated supporting arm, i.e., an arm which may be used for holding a functional element in a certain position with respect to an anchoring point of the articulated supporting arm.

Said articulated supporting arm may plastically modify its position manually by applying a force thereto, but once said force is no longer applied on the articulated supporting arm, the latter maintains its new position on its own.

The proposed articulated supporting arm comprises rigid sections articulated by means of flexible sections. The flexible sections comprise:

- a plurality of flat strips elongated in a longitudinal direction, each one being flexible and inelastic in the longitudinal direction and having two flat sides parallel to the longitudinal direction, said flat strips being mutually overlapping and in close contact through said flat sides; and
- a compressive covering pressing the plurality of mutually overlapping flat strips in a radial direction, pressing the flat sides together, increasing the friction therebetween, and preventing their lateral displacement, such that the flexural mobility of the flexible sections is limited to a plane perpendicular to the flat sides.

That is, the array of elongated and overlapping flat strips are kept with their respective flat sides overlapping and in close contact, pressed together by means of said compressive covering, which allows for a relative displacement between the flat strips in the longitudinal direction, but which prevents their lateral displacement, while pressing them together, thereby increasing the friction force therebetween.

Each flat strip may be elastically bent by applying a force in a direction normal to its flat sides greater than the elastic force applied by the flat strip, causing its bending on a plane perpendicular to said flat sides. Therefore, it will only be possible to bend the core formed by the array of overlapping flat strips on said plane perpendicular to the flat sides by applying a force in a direction normal, i.e. perpendicular, to the flat sides that exceeds the sum of all the elastic forces of all the overlapping flat strips.

By bending an array of overlapping flat strips that are inelastic in the longitudinal direction, a relative displacement will occur in the longitudinal direction between said flat strips, since the inner and outer curvature radii of an element with a certain thickness, as is the case with the array of overlapping flat strips, are different.

In addition, the flat sides in close contact, pressed together by means of said compressive covering, have a static friction coefficient opposing the elastic return of the elongated strips to their original position. Once the core is manually bent, said static friction coefficient keeps it from returning to its initial position, said static friction coefficient thereby maintaining the core in the bent position.

Obviously, in order to modify the position of the supporting arm the user must not only exceed the sum of all the static friction coefficients of all the flat strips, but must also overcome said static friction coefficient so as to start the movement. Once the movement has started, the static friction coefficient is replaced by a dynamic friction coefficient, which is smaller than the static friction coefficient.

Therefore, the proposed invention consists in wrapping an array of flat strips, which are longitudinally inelastic but transversally elastic, with a compressive covering that forces the strips to permanently keep in close contact, forming a flexible array in the direction transversal to the flat strips. By means of the bending of the array in a direction perpendicular to the strips, a displacement therebetween occurs, due to the different curvature radii of each of them, as long as the deformation force (bending moment) exceeds the resistance produced by the static friction coefficient between the strips. The relative displacement between the strips, forced by the deformation of the strips, generates an elastic force in a direction perpendicular to the strips, as well as a resisting force due to the static friction coefficient between the strips opposing it and preventing the return of the array to the initial position.

The spring effect, produced by the elastic force applied by the strips when they are bent, may be adjusted using different materials both in their composition and in their thickness. The static friction coefficient may also be adjusted by means of the topology or geometrical state of the surfaces in mutual contact. The compression force on the strips may be adjusted by means of an outer or inner compression through the inclusion of a compressive covering wrapped with different tension, which may be made of an elastic material or through the inclusion of an elastic material strip therein, which, when compressed, presses the other strips against the compressive covering. It is also possible to apply a compression force on the strips by using magnetizable ferric materials for the strips and a magnetized tape therein or with outer or inner magnets compressing the strips. The idea is to find a suitable balance between all these forces to achieve a suitable balance between the present static and dynamic coefficients so as to achieve the desired supporting force on the end of the arm for holding a static load thereon, while the displacement force thereof remains as gentle as possible.

This invention further proposes, in a manner unknown in the known state of the art, the following characteristics:

- the arm comprises at least one first, second, and third rigid sections and a first and second alternating flexible sections;
- the plurality of flat strips and the compressive covering span uninterruptedly from the first rigid section to the third rigid section, establishing that the first and second flexible sections have flexural mobility on the same plane perpendicular to the flat sides, and that the bending of the first flexible section in one direction determining the bending of the second flexible section in the opposite direction;
- one of the flat strips has a first end attached to the first rigid section and a second end, opposite the first end, attached to the third rigid section, serving as an anchoring strip; and
- each one of the flat strips other than the anchoring strip is attached to the entirety of the remaining flat strips at a first end of said flat strips comprised on the first rigid section.

This way, the supporting arm includes, in succession, a first rigid section, a first flexible section, a second rigid section, a second flexible section, and a third rigid section. Preferably, the first rigid section will be linked or connected to a support, the second and the third rigid sections being cantilevered relative to the first rigid section.

The supporting arm will include a core comprised of said plurality of flat strips wrapped by the compressive covering that uninterruptedly spans at least part of the first rigid section, all three of the first flexible section, the second rigid section, and the second flexible section, and at least part of the third rigid section. In the rigid sections, a stiffening element will be associated with said core to keep it from bending; for example, a rigid tube arranged around a segment of said core, a rigid piece arranged perpendicularly with respect to the strips on the rigid sections or a rigid core contained within the compressive covering along with the remaining strips.

This way, the first flexible section and the second flexible section correspond to different sections of the same core comprised of multiple flat strips wrapped with a compressive covering. Therefore, the first flexible section and the second flexible section may both carry out a flexural movement only on a plane perpendicular to the flat sides of the elongated strips, determining a movement of the first, second, and third rigid sections also on said plane perpendicular to the flat sides, causing the displacement of the arm to occur on a single plane.

One of the flat strips will be anchored by its ends to the first and third rigid sections, restraining the assembled array, acting as the neutral fiber of the array, and receiving the name of anchoring strip. Preferably, none of the remaining flat strips will have several anchoring points located on different rigid sections, since that would hinder the relative displacement between the flat strips, preventing the bending of the array. According to the preferred embodiment, the flat strips are linked together only in the first rigid section.

In addition, when the same flat strips cross the first and second flexible sections, the movement of the first flexible section is transmitted to the second flexible section through said flat strips, causing the bending of the first flexible section to bring about a bending of the second flexible section in the opposite direction.

When a flexible section bends, a relative sliding occurs between the flat strips that comprise it, and, since the flat strips are longitudinally inelastic, it is transmitted along the entire length of the flat strips.

The bending of the flexible section toward a side causes a displacement of the flat strips in the longitudinal direction, the flat strips being located on a side of the anchoring strip functioning as a neutral fiber sliding in one direction and the remaining strips located on the other side of the anchoring strip sliding in the opposite direction. Thus, at the end of the array, the strips having a curvature radius greater than the curvature radius of the anchoring strip will undergo an apparent retraction relative to the anchoring strip, whereas the others will undergo an apparent extension relative to the anchoring strip. When the bending of the flexible section is toward the opposite side, the sliding directions of the flat strips are inverted.

Therefore, when two flexible sections that bend in opposite directions are linked together, part of the sliding is mutually canceled out, reducing or even canceling the apparent extension or retraction of the end, since the curvature radius of some fibers will be greater than the curvature radius of the anchoring strip in the first flexible section, but smaller in the second flexible section, or vice versa.

The static and dynamic friction coefficients between the flat sides in contact oppose the sliding of the strips. Therefore, it is easier, i.e. less energy is needed, for the bending of the first flexible section to cause the bending of the second flexible section in an opposite direction, reducing the sliding between the strips.

These characteristics cause the resulting supporting arm to have a parallelogram-type movement, i.e. when affixing the first rigid section, by modifying the inclination of the second rigid section, the third rigid section is caused to be displaced without modifying its angle with respect to the vertical or the horizontal references, achieving a completely linear displacement of the third rigid section without suffering a variation in its inclination.

Preferably, the number, size and roughness of the flat strips, as well as the compressive force of the compressive covering, will be selected so that the static friction coefficient resulting from the sum of the static friction coefficients between the entirety of the opposing flat sides will be greater than the other forces affecting the supporting arm to modify its position, which will be the elastic force applied by the array of elastic strips and the weight of the supporting arm itself and the weight of any element supported by said supporting arm.

Only one of the flat strips of each core has both its opposite ends anchored to the respective first and third arm sections, serving as an anchoring strip, the remaining flat strips having at least one of their two opposite ends unanchored to either of said first and second arm sections, allowing for a relative sliding in the longitudinal direction between the flat strips of a flexible section when it bends.

According to an additional embodiment, the radial compression produced by the compressive covering (it may be distributed in different areas along the articulated arm in order to obtain the necessary friction forces to succeed in balancing the weight of the element held by the end of the arm) (also based on the weight to be held, the thickness or the flexibility of the constituent material of the strips may be varied such that they will act as a counter spring that, when added to the generated friction forces, they will balance the weight to be held by the end of the arm) will be greater around sections of the flat strips comprised in the third rigid section than around sections of the flat strips comprised in the first rigid section, the first flexible section, and/or the second rigid section. This increases the static friction in the section downstream the second flexible section, and, therefore, increases the effect described hereinabove that causes the second flexible section to replicate the bending of the first flexible section but in the opposite direction.

Preferably, a second end of the flat strips other than the anchoring strip, opposite the first end, will be housed in the expansion housing that is hollow in the longitudinal direction contained in the third rigid section. This allows for the sliding of the flat strips when necessary, but keeping said flat strips hidden within said expansion housing.

The anchoring strip, which is typically in the center of the array of overlapping flat strips, will, preferably, be a metal strap, preferably stainless or with an anti-rust treatment. The anchoring strip may have a thickness equal to or less than 0.6 mm, for example for those applications wherein the supporting arm only holds light weights lower than 1 kg, such as, for instance, a lamp.

It is also proposed that at least two of said multiple flat strips be:

- electricity-conducting strips, with a first end connected to a power source, and with a second end, opposite the first end, connected to an electrical energy-consuming device; or
- electricity-conducting strips, with a first end connected to an electrical signal emitter and/or receiver, and with a second end, opposite the first end, connected to an electrical signal emitter and/or receiver; or
- light-conducting strips, with a first end connected to a light signal emitter and/or receiver, and with a second end, opposite the first end, connected to a light signal emitter and/or receiver.
- If more electrical connections are necessary, either more conducting tapes or associated conducting cables may be provided.

This configuration allows for the transmission of electrical energy to operate electric apparatuses located on the end of the supporting arm, of electrical signals, to send and/or receive signals through the supporting arm, for instance a keyboard, a cell phone, a tablet or between a sensor, such as a camera, located on the end of the supporting arm and a control device of said sensor not held by said supporting arm.

The flat strips other than the anchoring strip or the flat strips other than the anchoring strip and other than the conducting strips may indistinctly be metallic or made of a plastic material or polyester or polystyrene or polypropylene or any material with suitable flexibility. Preferably, said flat strips have a thickness equal to or less than 1 mm.

The compressive covering will preferably comprise:

- a strip tightly wound around the multiple flat strips;
- two strips tightly wound around the multiple flat strips in opposite directions;
- an elastic tubular sheath;
- a retractile elastic plastic tubular sheath;
- magnetic strips;
- a plurality of magnets arranged along the strips.

Therefore, said compressive covering may be formed by one or several strips wound around the flat strips, by an elastic tubular sheath surrounding and elastically pressing the array of strips, a retractile plastic tubular sheath surrounding and pressing the strips, or the compressive covering may also consist of one or several magnetic tapes or magnets conveniently arranged to achieve such an effect.

Additionally, it is proposed that the compressive covering may also include a reinforcing covering around the flexible sections. The reinforcing covering may consist of a metal wire braided tube tightly wound around each flexible section. Said reinforcing covering improves the strength and the durability of the compressive covering in the flexible sections and the lateral stability of the arm.

Each rigid section is preferably formed either by a rigid tube surrounding a portion of said plurality of flat strips surrounded by the compressive covering, preventing the bending of said portion, or by rigid side (metal or plastic) pieces and an outer sheath that might be made of flexible plastic or of a metal wire or textile braided tube.

The inclusion of a lubricant between the overlapping flat sides is also contemplated, to ease their sliding.

BRIEF DESCRIPTION OF THE FIGURES

The above and other advantages and characteristics will be more fully understood from the following detailed description of an exemplary embodiment with reference to the attached drawings, which must be taken illustratively and not by way of limitation, wherein.

DETAILED DESCRIPTION OF AN EXEMPLARY EMBODIMENT

Figure 1:
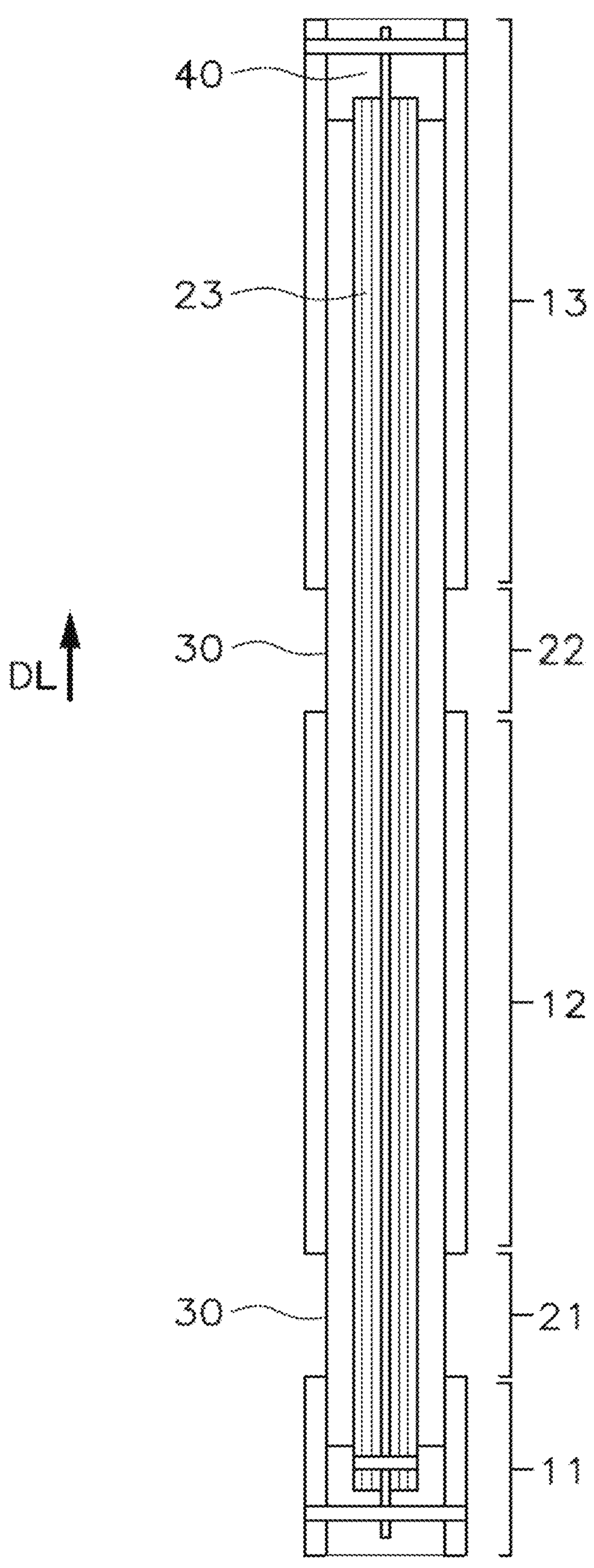
FIG. 1 shows a schematic view of the proposed supporting arm, the first, second, and third rigid sections being aligned.

The attached figures show exemplary embodiments of the present invention with an illustrative, non-limiting character.

According to a preferred embodiment, the proposed articulated supporting arm has an end attached to a mounting base, such as, for instance, a plinth or a clamp, the remaining part of the articulated supporting arm being cantilevered relative to the mounting base. The opposite end of the articulated supporting arm will have a functional element, such as a light emitter (for example, a LED lamp), for example, a clamp, a magnifying glass, a screen, a working tool or any other device or element requiring an adjustable position.

In this embodiment, the proposed articulated supporting arm consists of a first rigid section 11, a second rigid section 12, and a third rigid section 13 in succession, connected with each other by means of a first articulated section 21 and a second articulated section 22 sandwiched between the rigid sections 11, 12, and 13.

A core, formed by a plurality of overlapping flat strips 23 elongated in a longitudinal direction LD, which are flexible but inelastic in the longitudinal direction LD, spans uninterruptedly from the first rigid section 11 to the third rigid section 13.

Each flat strip 23 has two opposite flat sides 24, which are the largest ones of flat strip 23, parallel to the longitudinal direction LD, the flat sides 24 of the overlapping flat strips 23 being in close contact therebetween, generating a friction therebetween brought about by the static friction coefficient when there is no relative displacement and by a dynamic friction coefficient when there is a relative displacement.

Figure 5:
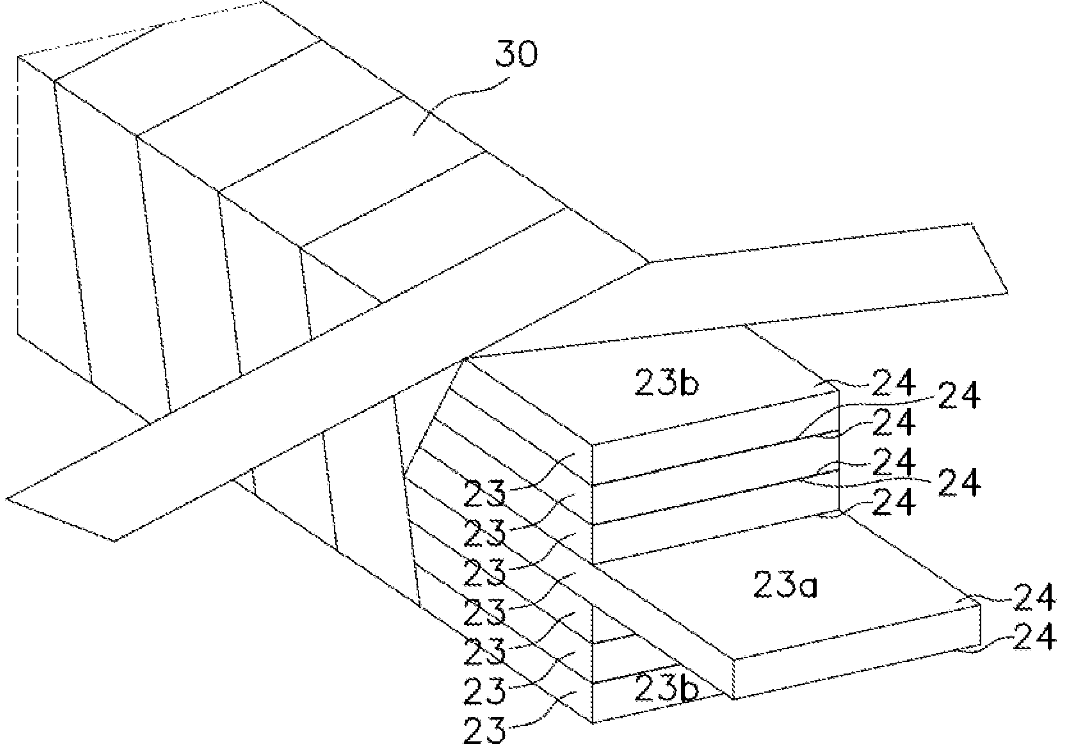
FIG. 5 shows an enlarged view of the end of the flat strip array where two strips constituent of the compressive covering are shown half wrapped around the flat strips.

Said core of flat strips 23 is wrapped by a compressive covering 30 in the shape of a flat strip tightly wound around the core of the overlapping flat strips 23, or, alternatively, in the shape of two flat strips wound in opposite directions around the core of flat strips 23, as shown in FIG. 5. This compressive covering 30 generates a compression force on the overlapping flat strips 23 in a direction perpendicular to the flat sides 24, ensuring their close contact at all times and increasing the static and dynamic friction coefficients, while preventing a lateral displacement between the flat strips 23 in a direction transverse to the longitudinal direction.

A core formed by seven flat strips 23 is schematically shown in the figures, but said core will preferably consist of more than ten flat strips 23.

A center flat strip 23 of the core has an end attached to the first rigid section 11 and another opposite end attached to the third rigid section 13, serving as an anchoring strip 23*a* that keeps the array of the articulated supporting arm linked together. The remaining flat strips 23 have an end, located on the first rigid section 11, attached to the remaining flat strips 23, the rest of its length being unattached, allowing for a relative sliding between said flat strips 23 in the longitudinal direction LD.

Each of first, second, and third rigid sections 11, 12, and 13 consists of a rigid tube surrounding a section of the core of flat strips 23, preventing said section from bending but allowing a relative sliding between the flat strips 23 in the longitudinal direction LD therein. In the first and second flexible sections 21, 22 there is no rigid covering, thus allowing for the bending of the core in said first and second flexible sections 21, 22.

Optionally, the first and second flexible sections 21, 22 also include a reinforcing covering formed by a tight metal wire braided tube around each flexible section 21, 22.

Figure 3:
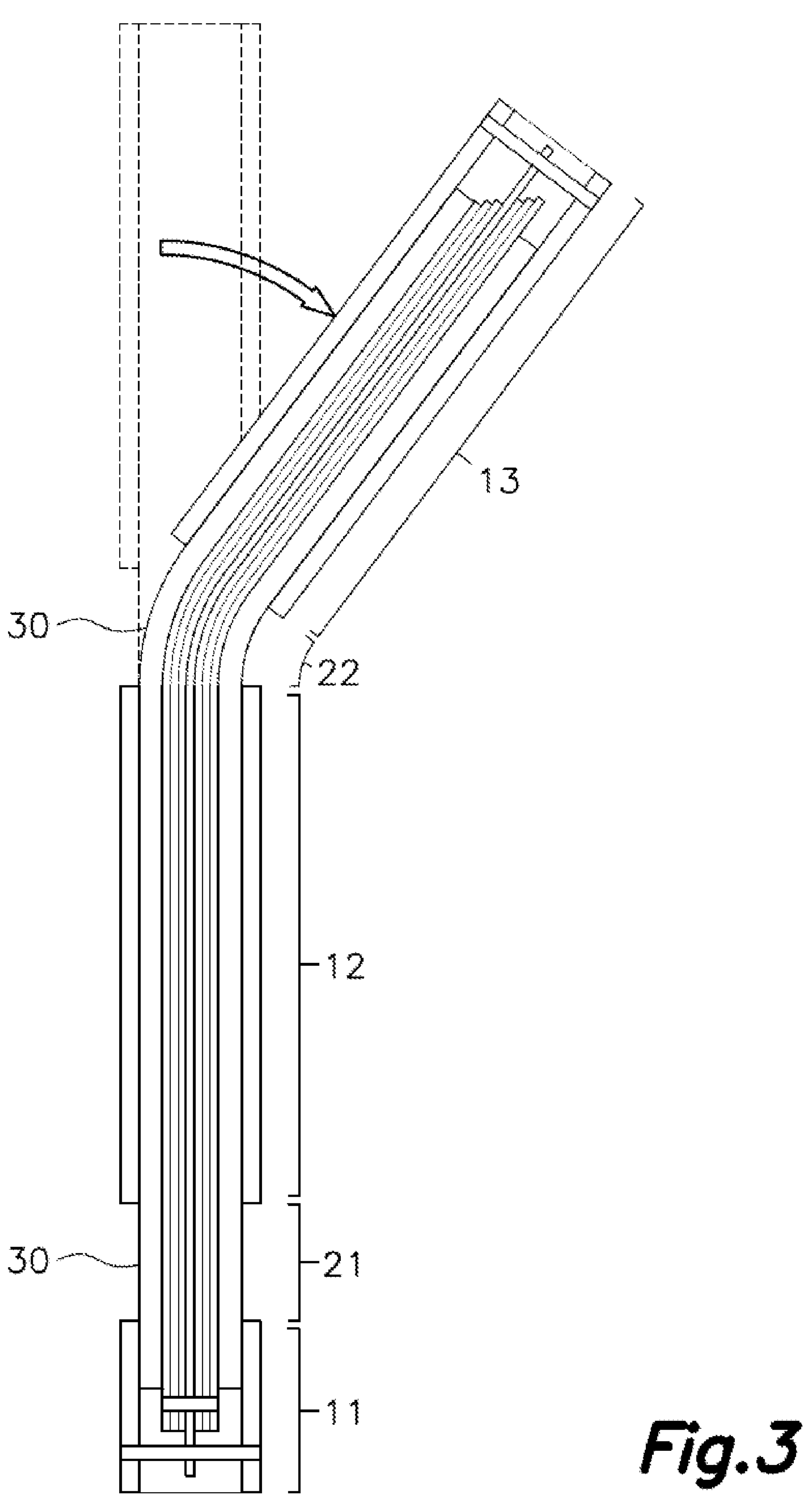
FIG. 3 shows the same supporting arm shown in FIG. 1 wherein a force, depicted with an arrow, has been applied perpendicular to the flat strips on the third rigid section, causing the bending of the second flexible section, causing a relative sliding between the flat strips on their end most distal from the first rigid section.

With this configuration, when an external force is applied on the third rigid section 13, its angle may be modified relative to the second rigid section 12 causing the bending of the second flexible section 22, as shown in FIG. 3. This bending of the second flexible section 22 causes a relative sliding between the overlapping flat strips 23 contained within the third rigid section 13, causing that on the end of the core contained within the third rigid section 13 a relative sliding between the flat strips 23 should occur. Those flat strips that in the second flexible section 22 have a curvature radius smaller than the curvature radius of the anchoring strip 23*a* will project forwardly on the end of the core, occupying an expansion housing 40 provided within the third rigid section 13 following the end of the flat strips 23.

Figure 2:
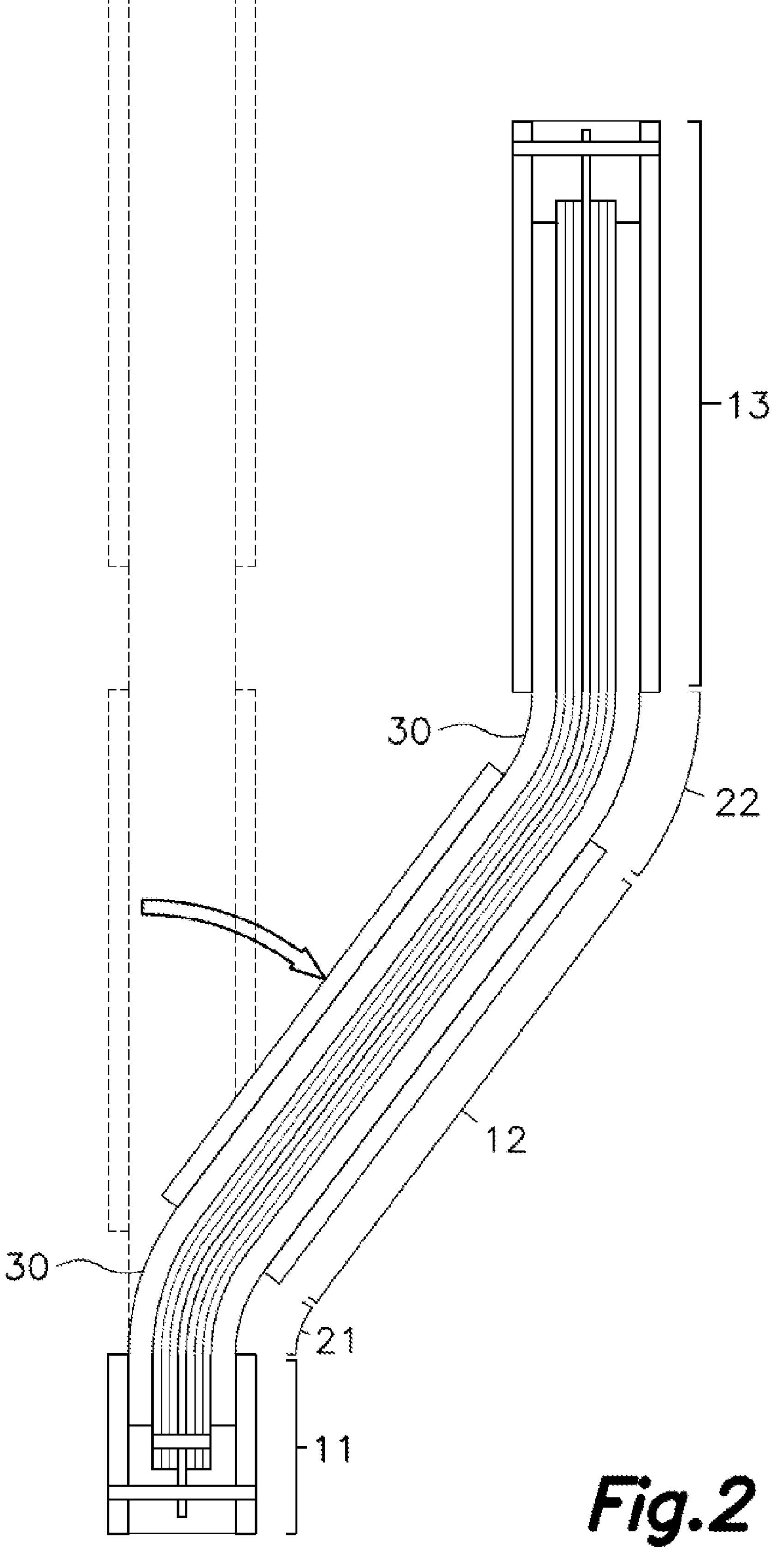
FIG. 2 shows the same supporting arm shown in FIG. 1 wherein a force, depicted with an arrow, has been applied perpendicular to the flat strips on the second rigid section, causing the bending of the first flexible section and the bending in the opposite direction of the second flexible section, causing a displacement without rotation of the third rigid section relative to the initial position shown in FIG. 1.
Figure 4:
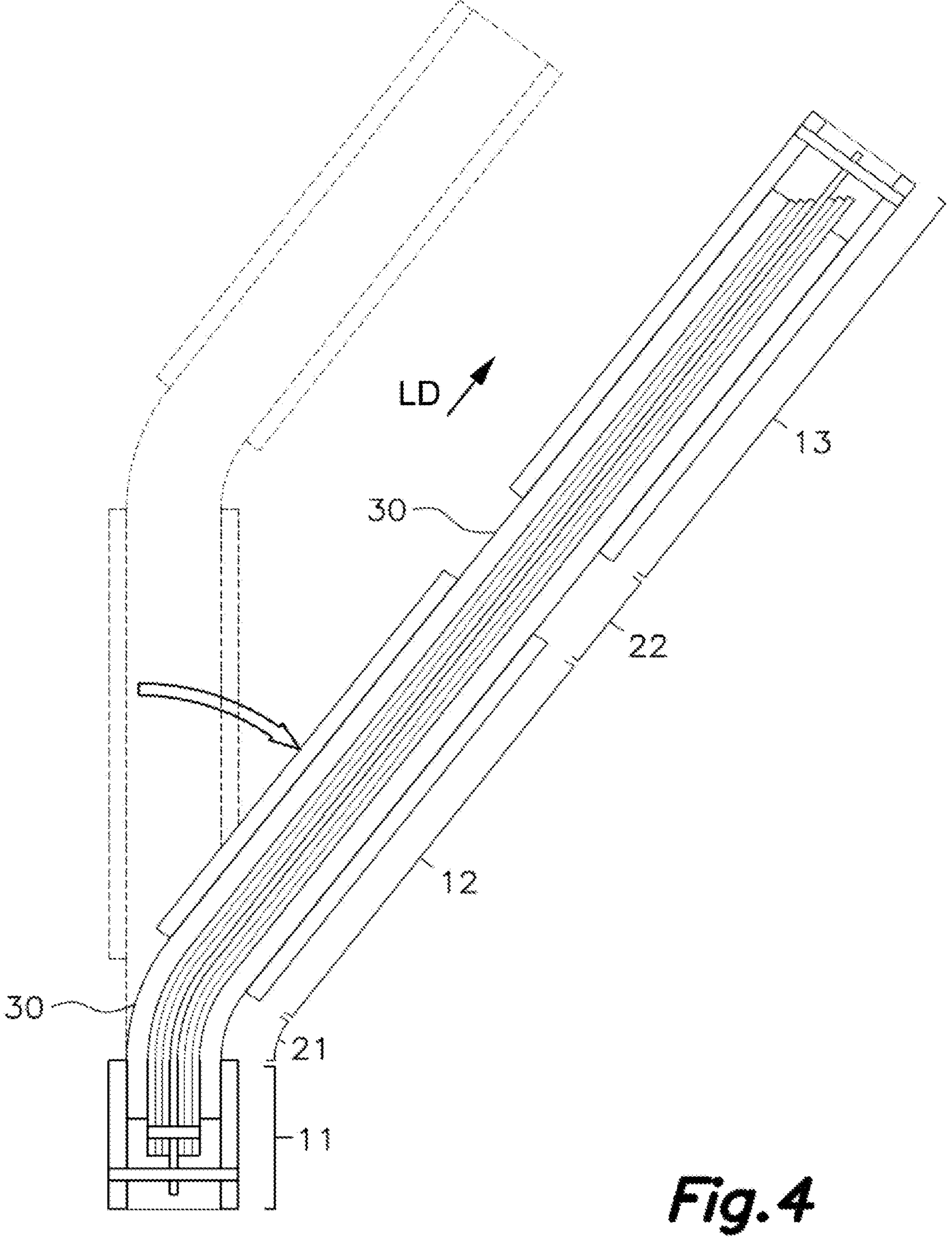
FIG. 4 shows the same supporting arm shown in FIG. 3 wherein a force, depicted with an arrow, has been applied perpendicular to the flat strips on the second rigid section in the opposite direction, causing the bending of the first flexible section and the bending of the second flexible section, causing a displacement without rotation of the third rigid section relative to the initial position shown in FIG. 3.

If the external force is applied on the second rigid section 12, causing its rotation relative to the first rigid section and causing the bending of the first flexible section 21, as shown in FIGS. 2 and 4, the second flexible section 22 will undergo an equal bending to that of the first flexible section 21 but in the opposite direction, causing the displacement of the third rigid section 13 without modifying its inclination relative to the vertical or the horizontal reference.

It is also proposed that two of the flat strips 23 be electricity-conducting 23*b* or light-conducting 23*b*, allowing for the transmission of signals or of energy from the mounting base of the articulated supporting arm to the functional element located on its end.

The invention claimed is:

1. An articulated supporting arm comprising a first rigid section, a second rigid section, a third rigid section, a first flexible section between the first rigid section and the second rigid section, and a second flexible section between the second rigid section and the third rigid section, the articulated supporting arm being formed by:

- a plurality of flat strips elongated in a longitudinal direction and spanning uninterruptedly from the first rigid section to the third rigid section, each flat strip being flexible and inelastic in the longitudinal direction and having two flat sides parallel to the longitudinal direction and parallel to each other;
- at least one flat side of the flat sides of each of the flat strips is overlapped with, parallel to and in close contact with, at least one flat side of the flat sides of at least one adjacent flat strip;
- each of the flat strips has a first end attached to the first rigid section and a second end opposite the first end, and only one of the flat strips, serving as an anchoring strip, has the second end attached to the third rigid section;
- a compressive covering spanning uninterruptedly from the first rigid section to the third rigid section, compressing the flat strips in a radial direction, pressing the overlapped flat sides together, increasing friction between the overlapped flat sides, and preventing lateral displacement of the flat strips, such that flexural mobility of the first and second flexible sections is limited to a flexural plane perpendicular to the overlapped flat sides; and
- a bending of the first flexible section in a first direction is transmittable to the second flexible section through a slip between the flat strips, causing an automatic bending of the second flexible section on the flexural plane in a second direction opposed to the first direction.

2. The articulated supporting arm according to claim 1, wherein the compressing of the flat strips in the radial direction produced by the compressive covering around sections of the flat strips comprised on the third rigid section is greater than around sections of the flat strips comprised on the first rigid section, the first flexible section, and/or the second rigid section.

3. The articulated supporting arm according to claim 2, wherein the flat strips, excluding the anchoring strip, each have the second end housed in an expansion housing, and the expansion housing is hollow in the longitudinal direction and provided within the third rigid section.

4. The articulated supporting arm according to claim 1, wherein the anchoring strip is a metal strap and/or has a thickness equal to or less than 0.6 mm.

5. The articulated supporting arm according to claim 1, wherein at least two of the flat strips are:

electricity-conducting strips, having a first end connectable to a power source, and having a second end, opposite the first end, connectable to an electrical energy-consuming device; or electricity-conducting strips, having a first end connectable to a first electrical signal emitter and/or a first electrical signal receiver, and having a second end, opposite the first end, connectable to a second electrical signal emitter and/or a second electrical signal receiver; or light-conducting strips, having a first end connectable to a first light signal emitter and/or a first light signal receiver, and having a second end, opposite the first end, connectable to a second light signal emitter and/or a second light signal receiver.

6. The articulated supporting arm according to claim 5, wherein the flat strips, excluding the anchoring strip and the electricity-conducting strips, are made of a plastic material, polyester, polystyrene or polypropylene and/or each have a thickness equal to or less than 1 mm.

7. The articulated supporting arm according to claim 1, wherein the flat strips, excluding the anchoring strip, are made of a plastic material, polyester, polystyrene or polypropylene and/or each have a thickness equal to or less than 1 mm.

8. The articulated supporting arm according to claim 1, wherein the compressive covering comprises one of the following:

a strip tightly wound around the flat strips; or two strips tightly wound in opposite directions around the flat strips.

9. The articulated supporting arm according to claim 1, wherein each rigid section is formed by a rigid tube surrounding a portion of the flat strips.

10. The articulated supporting arm according to claim 1, wherein the plurality of flat strips include an equal number of flat strips on each of the flat sides of the anchoring strip.

11. The articulated supporting arm according to claim 1, wherein each of the flat sides of each of one or more flat strips of the flat strips is overlapped with, parallel to and in close contact with, a respective one of the flat sides of two opposed adjacent flat strips located on the flat sides of the flat strip.

* * * * *